(12) United States Patent
Yoshimura et al.

(10) Patent No.: US 11,433,647 B2
(45) Date of Patent: Sep. 6, 2022

(54) POLYESTER RESIN-COATED METAL SHEET AND CONTAINER USING SAME

(71) Applicants: TOYO KOHAN CO., LTD., Tokyo (JP); TOYO SEIKAN CO., LTD., Shinagawa-ku (JP)

(72) Inventors: Kunihiro Yoshimura, Yamaguchi (JP); Shinichi Taya, Yamaguchi (JP); Tomoko Manita, Kanagawa (JP)

(73) Assignees: TOYO KOHAN CO., LTD., Tokyo (JP); TOYO SEIKAN CO., LTD., Tokyo (JP)

( * ) Notice: Subject to any disclaimer, the term of this patent is extended or adjusted under 35 U.S.C. 154(b) by 556 days.

(21) Appl. No.: 15/737,267

(22) PCT Filed: Feb. 19, 2016

(86) PCT No.: PCT/JP2016/054928
§ 371 (c)(1),
(2) Date: Dec. 15, 2017

(87) PCT Pub. No.: WO2016/203785
PCT Pub. Date: Dec. 22, 2016

(65) Prior Publication Data
US 2018/0170010 A1 Jun. 21, 2018

(30) Foreign Application Priority Data
Jun. 16, 2015 (JP) ............................. JP2015-121267

(51) Int. Cl.
*B32B 15/09* (2006.01)
*B65D 1/12* (2006.01)
(Continued)

(52) U.S. Cl.
CPC ............... *B32B 15/09* (2013.01); *B65D 1/00* (2013.01); *B65D 1/12* (2013.01); *B32B 2307/54* (2013.01); *C08L 67/02* (2013.01); *C08L 71/08* (2013.01)

(58) Field of Classification Search
CPC . B32B 15/09; B32B 2255/06; B32B 2439/66; B32B 15/04; B32B 15/08;
(Continued)

(56) References Cited

U.S. PATENT DOCUMENTS 5,912,307 A * 6/1999 Paschke ............... C08G 63/189
525/444
6,420,010 B1 * 7/2002 Hasegawa ............... B32B 15/09
428/323

(Continued)

FOREIGN PATENT DOCUMENTS

EP 0807517 A2 * 11/1997 ............. B32B 15/08
EP 928684 A2 7/1999
(Continued)

OTHER PUBLICATIONS

Natural Pigments website accessed online at https://www.naturalpigments.com/titanium-dioxide-pigment.html on Mar. 19, 2020 (Year: 2020).*

(Continued)

*Primary Examiner* — Lee E Sanderson
(74) *Attorney, Agent, or Firm* — Intellectual Property Law Group LLP (57) ABSTRACT

[Problem] To provide a polyester resin-coated metal sheet which has excellent coating material adhesion capable of withstanding severe forming processing while retaining high decorative property and photoluminescence property and a container using the same. [Solution] The polyester resin-coated metal sheet of the present invention includes a metal (Continued)

sheet, and a non-oriented polyester resin formed of a plurality of layers provided on at least one surface of the metal sheet. A surface layer and an adjacent layer in contact with the surface layer, of the plurality of layers, have a difference therebetween in melting temperature of not less than 10° C., and a difference in tensile stress at an elongation of 250% under an environmental temperature of 70° C. of less than 3 MPa in tensile tests in a single-layer film state corresponding to each layer, and the surface layer contains fine particles.

9 Claims, 8 Drawing Sheets (51) Int. Cl.
C08L 67/02 (2006.01)
B65D 1/00 (2006.01)
C08L 71/08 (2006.01)

(58) Field of Classification Search
CPC .............. B65D 1/12; Y10T 428/1355; Y10T 428/31681; B05D 7/52; B05D 7/56; B05D 7/53; B21D 51/26; C09J 167/02; C09J 167/03; C08J 2367/02; C08L 67/02
USPC ................ 428/35.8, 35.9; 72/379.2, 379.4
See application file for complete search history.

(56) References Cited

U.S. PATENT DOCUMENTS

| 2006/0172100 | A1* | 8/2006 | Hu ......................... | B05D 7/14 428/35.8 |
| 2009/0145898 | A1* | 6/2009 | Takatsu ................. | B32B 15/08 220/62.22 |
| 2013/0052478 | A1* | 2/2013 | Kurokawa ............. | B32B 15/08 428/626 |

FOREIGN PATENT DOCUMENTS

| JP | 2-501644 A | 6/1990 |
| JP | 2000-211083 A | 8/2000 |
| JP | 2003-220679 A | 8/2003 |
| JP | 2006-256206 A | 9/2006 |
| JP | 2011-178134 A | 9/2011 |
| WO | WO 2000/058087 | 10/2000 |
| WO | WO 2001/017768 A1 | 3/2001 |

OTHER PUBLICATIONS

Wypych, George, Handbook of Fillers 4th Ed., ChemTec Publishing, Toronto, 2016 (Year: 2016).*
International Search Report, dated May 24, 2016 for corresponding International Application No. PCT/JP2016/054928 with English translation.
Written Opinion of ISA, dated May 24, 2016 for corresponding International Application No. PCT/JP2016/054928.

* cited by examiner

| | | Specifications of polyester resin ||||||||||
| | | Surface layer |||||| Lower layer ||||
| | | Melting temperature (°C) | Thickness (μm) | Fine particles ||| Melting temperature (°C) | Thickness (μm) | Fine particles |||
| | | | | Kind | Particle diameter | vol% | | | Kind | Particle diameter | vol% |
|---|---|---|---|---|---|---|---|---|---|---|---|
| Example | 1 | 235 | 4 | TiO₂ | 0.25μm | 1.0% | 215 | 16 | No additive | — | — |
| Example | 2 | 235 | 4 | TiO₂ | 0.25μm | 1.8% | 215 | 16 | No additive | — | — |
| Example | 3 | 235 | 4 | TiO₂ | 0.25μm | 3.6% | 215 | 16 | No additive | — | — |
| Example | 4 | 235 | 4 | TiO₂ | 0.25μm | 5.0% | 215 | 16 | No additive | — | — |
| Example | 5 | 235 | 10 | TiO₂ | 0.25μm | 1.8% | 215 | 10 | No additive | — | — |
| Example | 6 | 235 | 16 | TiO₂ | 0.25μm | 1.8% | 215 | 4 | No additive | — | — |
| Example | 7 | 235 | 4 | TiO₂ | 0.25μm | 1.8% | 215 | 16 | TiO₂ | 0.25μm | 5% |
| Example | 8 | 235 | 4 | TiO₂ | 0.25μm | 1.8% | 215 | 16 | TiO₂ | 0.25μm | 12% |
| Example | 9 | 235 | 4 | TiO₂ | 0.25μm | 1.8% | 215 | 16 | TiO₂ | 0.25μm | 15% |
| Example | 10 | 235 | 4 | SiO₂ | 1.0μm | 1.0% | 215 | 16 | No additive | — | — |
| Example | 11 | 235 | 4 | SiO₂ | 1.0μm | 2.5% | 215 | 16 | No additive | — | — |
| Example | 12 | 235 | 4 | SiO₂ | 1.0μm | 5.0% | 215 | 16 | No additive | — | — |
| Example | 13 | 235 | 4 | SiO₂ | 1.0μm | 2.5% | 215 | 16 | TiO₂ | 0.25μm | 12% |
| Comparative Example | 1 | 235 | 4 | No additive | — | — | 215 | 16 | No additive | — | — |
| Comparative Example | 2 | 235 | 4 | SiO₂ | 2.5μm | 0.2% | 215 | 16 | TiO₂ | 0.25μm | 12% |
| Comparative Example | 3 | 235 | 4 | SiO₂ | 2.5μm | 1.0% | 215 | 16 | TiO₂ | 0.25μm | 12% |
| Comparative Example | 4 | 215 | 4 | No additive | — | — | 215 | 16 | No additive | — | — |

| | Tensile strength of single-layer film corresponding to surface layer and lower layer (MPa: elongation 250%) | | | | | Difference between surface layer and lower layer (MPa) | | Evaluation results | | |
|---|---|---|---|---|---|---|---|---|---|---|
| | 70°C | | 90°C | | | | | Formability | Evaluation on heat treatment step | Coating material adhesion |
| | Surface layer | Lower layer | Surface layer | Lower layer | | 70°C | 90°C | | | |
| Example 1 | 14.6 | 13.5 | 4 | 3.1 | | -1.1 | -0.9 | ○ | ○ | ◎ |
| Example 2 | 14.6 | 13.5 | 4.5 | 3.1 | | -1.1 | -1.4 | ○ | ○ | ◎ |
| Example 3 | 14.6 | 13.5 | 5.1 | 3.1 | | -1.1 | -2.0 | ○ | ○ | ○ |
| Example 4 | 14.7 | 13.5 | 5.9 | 3.1 | | -1.2 | -2.8 | ○ | ○ | ○ |
| Example 5 | 14.6 | 13.5 | 4.5 | 3.1 | | -1.1 | -1.4 | ○ | ○ | ○ |
| Example 6 | 14.6 | 13.5 | 4.5 | 3.1 | | -1.1 | -1.4 | ○ | ○ | ◎ |
| Example 7 | 14.6 | 14.3 | 4.5 | 4.7 | | -0.3 | 0.2 | ○ | ○ | ◎ |
| Example 8 | 14.6 | 16.7 | 4.5 | 7.3 | | 2.1 | 2.8 | ○ | ○ | ◎ |
| Example 9 | 14.6 | 17 | 4.5 | 7.8 | | 2.4 | 3.3 | ○ | ○ | ◎ |
| Example 10 | 13.2 | 13.5 | 3.9 | 3.1 | | 0.3 | -0.8 | ○ | ○ | ○ |
| Example 11 | 14.2 | 13.5 | 5.5 | 3.1 | | -0.7 | -2.4 | ○ | ○ | ○ |
| Example 12 | 15.5 | 13.5 | 6.7 | 3.1 | | -2.0 | -3.6 | ○ | ○ | ○ |
| Example 13 | 14.2 | 16.7 | 5.5 | 7.3 | | 2.5 | 1.8 | ○ | ○ | ○ |
| Comparative Example 1 | 11.58 | 13.5 | 3.1 | 3.1 | | 1.9 | 0.0 | ○ | ○ | × |
| Comparative Example 2 | 12.1 | 16.7 | 2.7 | 7.3 | | 4.6 | 4.6 | ○ | ○ | × |
| Comparative Example 3 | 12.2 | 16.7 | 2.9 | 7.3 | | 4.5 | 4.4 | ○ | ○ | × |
| Comparative Example 4 | 13.5 | 13.5 | 3 | 3 | | 0.0 | 0.0 | ○ | × | ◎ |

*(Single-layer film strength of core layer) - (Single-layer film strength of surface layer)

FIG. 5B

| | Composition of polyester resin | | | | | | | | | | | | | |
|---|---|---|---|---|---|---|---|---|---|---|---|---|---|---|
| | Surface layer | | | | | Core layer | | | | | Lower layer | | | |
| | Melting temperature (°C) | Thickness (μm) | Fine particles | | | Melting temperature (°C) | Thickness (μm) | Fine particles | | | Melting temperature (°C) | Thickness (μm) | Fine particles | | |
| | | | Kind | Particle diameter | vol% | | | Kind | Particle diameter | vol% | | | Kind | Particle diameter | vol% |
| Example 14 | 220 | 2 | TiO$_2$ | 0.25μm | 1.8% | 235 | 9 | TiO$_2$ | 0.25μm | 12% | 215 | 2 | SiO$_2$ | 2.5μm | 0.20% |
| Example 15 | 220 | 2 | TiO$_2$ | 0.25μm | 1.8% | 235 | 12 | TiO$_2$ | 0.25μm | 12% | 215 | 2 | SiO$_2$ | 2.5μm | 0.20% |
| Example 16 | 220 | 2 | TiO$_2$ | 0.25μm | 1.8% | 245 | 9 | TiO$_2$ | 0.25μm | 12% | 215 | 2 | SiO$_2$ | 2.5μm | 0.20% |
| Example 17 | 220 | 2 | TiO$_2$ | 0.25μm | 1.8% | 245 | 9 | TiO$_2$ | 0.25μm | 5% | 215 | 2 | SiO$_2$ | 2.5μm | 0.20% |
| Example 18 | 220 | 2 | TiO$_2$ | 0.25μm | 1.8% | 245 | 9 | TiO$_2$ | 0.25μm | 17% | 215 | 2 | SiO$_2$ | 2.5μm | 0.20% |
| Example 19 | 220 | 2 | TiO$_2$ | 0.25μm | 3.6% | 245 | 9 | TiO$_2$ | 0.25μm | 12% | 215 | 2 | SiO$_2$ | 2.5μm | 0.20% |
| Example 20 | 235 | 2 | TiO$_2$ | 0.25μm | 1.8% | 245 | 9 | TiO$_2$ | 0.25μm | 12% | 215 | 2 | SiO$_2$ | 2.5μm | 0.20% |
| Comparative Example 5 | 220 | 2 | No additive | | | 235 | 9 | TiO$_2$ | 0.25μm | 12% | 215 | 2 | SiO$_2$ | 2.5μm | 0.20% |

FIG. 6A

| | Tensile strength of single-layer film corresponding to surface layer and core layer (MPa: elongation 250%) | | | | Difference between surface layer and core layer (MPa) | | Evaluation results | | |
|---|---|---|---|---|---|---|---|---|---|
| | 70°C | | 90°C | | 70°C | 90°C | Formability | Evaluation on heat treatment step | Coating material adhesion |
| | Surface layer | Core layer | Surface layer | Core layer | | | | | |
| Example 14 | 16.9 | 18.5 | 3.8 | 7.5 | 1.6 | 3.7 | ○ | ○ | ◎ |
| Example 15 | 16.9 | 18.5 | 3.8 | 7.5 | 1.6 | 3.7 | ○ | ○ | ◎ |
| Example 16 | 16.9 | 18.7 | 3.8 | 7.3 | 1.8 | 3.5 | ○ | ○ | ◎ |
| Example 17 | 16.9 | 17.6 | 3.8 | 6.4 | 0.7 | 2.6 | ○ | ○ | ◎ |
| Example 18 | 16.9 | 19 | 3.8 | 8 | 2.1 | 4.2 | ○ | ○ | ◎ |
| Example 19 | 17 | 18.7 | 5.3 | 7.3 | 1.7 | 2.0 | ○ | ○ | ◎ |
| Example 20 | 16.9 | 18.7 | 3.8 | 7.3 | 1.8 | 3.5 | ○ | ○ | ◎ |
| Comparative Example 5 | 15.5 | 18.5 | 2 | 7.5 | 3.0 | 5.5 | ○ | ○ | × |

*(Single-layer film strength of core layer) − (Single-layer film strength of surface layer)

<Can circumferential direction>

<Can height direction>

POLYESTER RESIN-COATED METAL SHEET AND CONTAINER USING SAME

CROSS-REFERENCE TO RELATED APPLICATIONS

This application is a U.S. National Phase application, under 35 U.S.C. § 371, of International Application no. PCT/JP2016/054928, with an international filing date of Feb. 19, 2016, and claims benefit of Japanese Application no. JP 2015-121267 filed on Jun. 16, 2015, and which are hereby incorporated by reference for all purposes.

TECHNICAL FIELD

The present invention relates to a metal sheet coated with a polyester resin, and a container using the same. More specifically, the invention relates to a polyester resin-coated metal sheet in which exfoliation of a coating film on a can outer surface side is restrained and which is excellent in flavor property (invariableness of flavor) concerning the contents, and a container obtained by subjecting the same to deep drawing or a drawing and ironing operation.

BACKGROUND ART

Cans as containers for preserving and containing beverage or food have been widespread due to their excellent corrosion resistance and sealing property, irrespective of the kind of the contents. For beverage cans among these cans, a polyester resin-coated metal sheet having a metal sheet coated with a polyester resin is used for welded cans or seamless cans produced by conducting deep drawing or a drawing and ironing operation. In the case of use for the seamless cans, for the purpose of reduction in weight or reduction in materials cost or the like, those cans produced by using a severe processing method such as thin-wall drawing in which drawing ratio and/or thickness reduction ratio at a can wall portion is enhanced have been used in recent years.

On the other hand, a biaxially oriented polyester film obtained by biaxially orienting a polyester resin has been used as a resin for coating a metal sheet therewith, but limitations as to processability have come to be recognized due to the demand for further reduction in weight or for imparting of resealing property. In view of this, in such a situation in which the severity of the processing applied to the polyester resin has been increasing, non-oriented films excellent in processability have been used for restraining damaging (film cracking or the like) of the polyester resin at the time of processing (see PTL 1 and 2 below).

CITATION LIST

Patent Literature

PTL 1: WO 2001/017768
PTL 2: WO 2000/058087

SUMMARY

Technical Problems

In general, in polyester resin-coated seamless cans, after printing in ink or varnish on a can wall portion constituting an outer surface of a formed can, a heat treatment for the purpose of baking the ink or varnish is conducted. In recent years, in view of that design properties are demanded in regard of the external appearance of beverage cans, imparting decorative property and/or photoluminescence property to the external appearance of beverage cans by various methods has been investigated.

To be more specific, cases are increasing in which not only the printing technique using the conventional resin relief printing plate but also other techniques are used for outer surfaces of formed cans. Examples of the other techniques include a waterless plate printing technique, a technique of curing inks by irradiation with UV rays, and further a technique in which a film having undergone gravure printing is laminated onto metal cans, which techniques are used either singly or in combination of two or more of them.

Under such circumstances, problems which could not be supposed conventionally have come to appear. Specifically, as a result of various decorations and the like applied to the outer surfaces of formed cans, a problem in which ink exfoliation is liable to occur due to neck processing conducted after printing or due to mutual contact of cans thereafter or the like causes has been generated, depending on the printing technique, the kind of inks, changes in film thickness, etc.

The present invention has been made for solving such problems. It is an object of the present invention to provide a polyester resin-coated metal sheet which shows excellent coating material adhesion capable of withstanding severe forming processing while retaining high decorative property and photoluminescence property, and a container using the same.

Solution to Problems

In order to solve the above problems, a polyester resin-coated metal sheet according to one embodiment of the present invention is characterized in that (1) it includes: a metal sheet; and a non-oriented polyester resin including a plurality of layers provided on at least one surface of the metal sheet, in which, of the plurality of layers, a surface layer and an adjacent layer in contact with the surface layer have a difference therebetween in melting temperature of not less than 10° C., and a difference therebetween in tensile stress at an elongation of 250% under an environmental temperature of 70° C. of less than 3 MPa in tensile tests in a single-layer film state corresponding to each layer, and the surface layer contains fine particles.

Further, in the polyester resin-coated metal sheet possessing the characteristics described in (1) above, it is preferable that (2) the surface layer and the adjacent layer have a difference therebetween in tensile stress at an elongation of 250% under an environmental temperature of 90° C. of less than 5.5 MPa in tensile tests in a single-layer film state corresponding to each layer.

In addition, in the polyester resin-coated metal sheet possessing the characteristics described in (1) or (2) above, it is preferable that (3) the non-oriented polyester resin in the surface layer contains fine particles having a diameter of 0.1 to 2 μm in an amount of 0.1 to 20 vol %.

Besides, in the polyester resin-coated metal sheet possessing the characteristics described in (3) above, it is preferable that (4) the non-oriented polyester resin in the adjacent layer contains second fine particles having a diameter of 0.1 to 2 μm in an amount of 5 to 20 vol %.

In addition, in order to solve the above problems, a container according to one embodiment of the present invention is desirably formed by use of the polyester resin-coated metal sheet possessing the characteristics described in any one of (1) to (4) above. Note that examples of the container include cans and boxes for storing beverage, food, medicine or the like.

Advantageous Effect of Invention

According to the present invention, ink exfoliation can be restrained from occurring even in the case where the material undergoes severe processing steps. Therefore, it is possible to produce a polyester resin-coated metal sheet which shows excellent coating material adhesion capable of withstanding severe forming processing while retaining high decorative property and photoluminescence property, and a container using the same.

DESCRIPTION OF EMBODIMENTS

An embodiment for carrying out the present invention will be described below. Note that for convenience of explanation, an X-direction, a Y-direction and a Z-direction will be each defined in the following description, as required, but they are not intended to limit or restrict the scope of right of the present invention.

Embodiment

A polyester resin-coated metal sheet according to the present invention includes a metal sheet, and a non-oriented polyester resin composed of a plurality of layers provided on at least one surface of the metal sheet. Of the plurality of layers, a surface layer and a non-oriented polyester resin layer in contact with the surface layer (this non-oriented polyester resin layer may be referred to also as adjacent layer) desirably have a difference therebetween in melting temperature of not less than 10° C. In addition, the non-oriented polyester resin in the surface layer of the plurality of layers preferably contains fine particles having a diameter of 0.1 to 2 μm. Besides, the non-oriented polyester resin in each of the surface layer and the adjacent layer in contact with the surface layer has such properties that a difference therebetween in tensile stress at an elongation of 250% under an environmental temperature of 70° C. of less than 3 MPa in tensile tests in a single-layer film state.

<Elucidation of Ink Exfoliation Phenomenon>

As a result of investigation of the cause of an ink becoming liable to be exfoliated, it was found that the exfoliation is liable to occur not only under the influence of the kind of a coating material but also particularly in non-oriented films, that the exfoliation is liable to occur particularly at an upper end of a can wall portion of a seamless can coated with a polyester resin (in the vicinity of E1 in FIG. 2), and so on. In general, it has been considered that the adhesion property of a coating material applied to a seamless can such as an ink is influenced not only by the adhesive property between the polyester resin and the ink but also by wetting property (property indicative of the degree of hydrophilicity) of the polyester resin, surface state and the like. However, by investigations based on these factors, the phenomenon in which the exfoliation occurs particularly in the vicinity of the upper end of the can wall portion has not been solved.

As a result of further continued investigation and research, it was found out that a heat treatment applied to the polyester resin in the course of a forming step of the seamless can constitutes an important factor. Specifically, a seamless can coated with a polyester resin is generally subjected to a heat treatment for the purpose of, for example, relaxing the stress generated in the polyester resin in forming processing such as drawing, and for crystallizing the polyester resin on the can inner surface side, to thereby enhance corrosion resistance.

Corrosion resistance and impact resistance on the can inner surface side are important characteristics for beverage and food cans, and, when the heat treatment temperature is low, sufficient crystallization does not proceed and corrosion resistance cannot be enhanced sufficiently. On the other hand, when the heat treatment temperature is high, brittle and coarse crystals are grown, leading to lowered impact resistance. In short, the above-mentioned heat treatment applied to the polyester resin is required to satisfy both corrosion resistance and impact resistance, and, therefore, the preferable range of heat treatment temperature is extremely narrow.

As a result of the heat treatment carried out in the extremely narrow range, particularly in the case where the polyester resins are composed of a plurality of layers differing in characteristics, thermal stresses generated in respective layers are not uniform in each other. Therefore, as was found out, the residual stress in the polyester resin generated upon forming of the seamless can is greatly left after the heat treatment conducted after the forming for the purpose of stress relaxation, and the influence of the residual stress contributes greatly to the exfoliation of the coating film such as an ink.

To be more specific, in the polyester resin-coated seamless can after forming, a compressive residual stress is generated in a circumferential direction (the X-direction in FIG. 2 to be described later), and a tensile residual stress is generated in a height direction (the Z-direction in FIG. 2), at an upper portion of a can wall portion after the forming by drawing. Although these stresses are ordinarily relaxed by the heat treatment after the forming, in the case where a resin having a melting temperature higher than the heat treatment temperature is used or the like cases, all the stresses are not relaxed, so that the above-mentioned residual stress is generated even after the heat treatment.

Note that, considering a case where the temperature of the heat treatment for the purpose of stress relaxation is such as to heat to the vicinity of the melting temperature of the polyester resin, the polyester resin is surely softened in the vicinity of the melting temperature and, therefore, the stresses in the polyester resin are relaxed, and exfoliation of the ink is not liable to occur. However, since the seamless can is conveyed by a steel-made conveyor in the heat treatment step, too high a heat treatment temperature would cause the softened polyester resin to fuse to the conveyor and the like.

This leads to generation of failure or trouble in conveyance of the seamless cans or generation of fusion marks left on the conveyor, which is undesirable from the viewpoint of production or quality. Further, in the case where a resin (polyester resin or the like) is formed on the can inner surface side, the fusion exerts an influence also on the characteristics of the polyester resin on the can inner surface side, and, therefore, there is limitations on the measure of raising the heat treatment temperature.

In view of the foregoing, the present inventors made extensive and intensive investigations and, as a result, found out that when the residual stress in the polyester resin after drawing is reduced, ink exfoliation is restrained irrespectively of the kind and thickness of the coating material. Based on the finding, the inventors have completed the present invention.

Each component in an embodiment of the present invention will be described in detail below.

<Metal Sheet>

As a metal sheet to be a substrate of the polyester resin-coated metal sheet, there can be applied, for example, various surface-treated steel sheets such as tinplate, electrolytic chromate-treated steel sheet (tin free steel, hereinafter referred to also as TFS), and nickel-plated steel sheet. Furthermore, the metal sheet is not limited to steel sheet, and there may also be used aluminum alloy sheets, for example; thus, there is no limitation as to the metal sheet for preferable use in the present embodiment.

<Polyester Resin>

The polyester resin in the present embodiment is provided on at least one surface of the above-mentioned metal sheet. Examples of such a polyester resin include polyester resins containing at least one ester selected from among ethylene terephthalate, butylene terephthalate, 1,4-cyclohexanedimethyl terephthalate, ethylene isophthalate, butylene isophthalate, ethylene adipate, butylene adipate, ethylene naphthalate, and butylene naphthalate.

Note that the polyester resin in the present embodiment may be a polyester resin obtained by polycondensation of one or more monomers of the esters of the above-mentioned polyester resins, or a polyester resin obtained by blending two or more of these polyester resins.

Furthermore, other than the polyester resins of the above-mentioned structures, there can also be used, for example, those in which propylene glycol, diethylene glycol, neopentyl glycol, pentaerythritol or the like is used as the alcohol component of the ester unit.

In addition, in the present embodiment, the polyester resin is preferably non-oriented without being biaxially oriented after forming into a film on the metal sheet.

Besides, the polyester resin preferably has an intrinsic viscosity in the range of 0.6 to 1.4. Note that the values of the upper limit and the lower limit concerning the intrinsic viscosity may define an arbitrary range selected from among values ranging from 0.6 to 1.4 by increments of 0.1, with a more preferable range being of 0.8 to 1.2, for example.

With the intrinsic viscosity of the polyester resin set within the aforementioned range, cracking, checking, shaving, exfoliation from substrate, or the like of the resin can be restrained even under severe processing such as drawing for thinning.

Further, the polyester resin in the present embodiment is desirably formed of a plurality of layers. In other words, the polyester resin in the present embodiment is preferably a so-called multilayer film, and is preferably constituted of a two-layer or three-layer resin film.

Note that in the case where the polyester resin formed on the metal sheet is a plurality of layers, it is sufficient that at least the polyester resin of the surface layer has the aforementioned intrinsic viscosity value, and the intrinsic viscosities of the layers may be different or may be identical.

In this way, the resin compositions of the layers and modification amounts thereof are appropriately selected according to purposes such as adhesion to the metal sheet, processability, and heat resistance, and it is particularly desirable that the difference in melting temperature between a surface layer coming into contact with the ink and an adjacent layer in contact with the surface layer is not less than 10° C., more preferably not less than 30° C.

In other words, it can be said that the adjacent layer in contact with the surface layer of the polyester resin in the present embodiment produces a sufficient effect when the difference in melting temperature between itself and the surface layer is not less than 10° C. While the effect of the present embodiment can be obtained even if such an adjacent layer does not contain inorganic pigment, lubricant, filler or the like, an inorganic pigment such as titanium oxide may be added to the adjacent layer for such purposes as maintaining a hiding property for the metal sheet serving as the substrate. Note that as such an inorganic pigment or lubricant, there can be used materials similar to the fine particles added to the surface layer.

Here, the "melting temperature" used in the present embodiment refers to a temperature indicative of a maximum depth of endothermic peak generated upon heating at a heating rate of 10° C./minute by using a differential scanning calorimeter (DSC). In the case where this melting temperature is low, the endothermic peak may be small. In that case, for example, the temperature of an endothermic peak appearing when the polyester resin is heated to the vicinity of 300° C. to melt the polyester resin, is then cooled to normal temperature at a cooling rate of 300° C./minute and is again heated at 10° C./minute can be indicated as the melting temperature in the present embodiment.

In addition, the polyester resin in the present embodiment preferably contains fine particles having a diameter of 0.1 to 2.0 μm. Note that while the values of the upper limit and the lower limit concerning the diameter of the fine particles may define an arbitrary range selected from among values ranging from 0.1 to 2.0 by increments of 0.5, with a more preferable range being of 0.25 to 1.0 μm, for example. Note that in the case where the polyester resin is formed of a plurality of layers, the surface layer of the plurality of layers contains the fine particles having the diameter in the above-mentioned range. Note that in regard of the diameter of the fine particles, measurement was conducted by image analysis of an image obtained by imaging with a transmission electron microscope for titanium oxide, and by a laser light scattering method for silicon dioxide.

The addition amount of the fine particles contained in the polyester resin corresponding to the surface layer is preferably 0.1 to 20 vol %. Note that the values of the upper limit and the lower limit concerning the addition amount of the fine particles may define an arbitrary range selected from among values ranging from 0.1 to 20 by increments of 0.1, with a more preferable range being of 1 to 5 vol %, for example.

If the addition amount of the fine particles is less than 0.1 vol %, an improving effect on adhesion of a coating film is small, and, if the addition amount is more than 20 vol %, wearing of a forming tool is liable to occur at the time of drawing, both of which are unsuitable.

Note that the non-oriented polyester resin (adjacent layer) in contact with the surface layer may also contain fine particles (referred to also as second fine particles). In this case, the diameter of the second fine particles is preferably 0.1 to 2 µm. Besides, it is preferable that the second fine particles are contained in the non-oriented polyester resin in contact with the surface layer in an amount of 5 to 20 vol %.

In addition, the fine particles applicable in the present embodiment may be inorganic pigment or may be lubricant. In the case of inorganic pigment, there can be used, for example, white inorganic pigments such as rutile type or anatase type titanium oxide, zinc white, gloss white, precipitated perlite sulfate, calcium carbonate, gypsum, precipitated silica, aerosil, talc, calcined or uncalcined clay, barium carbonate, alumina white, synthetic or natural mica, synthetic calcium silicate, and magnesium carbonate; black pigments such as carbon black, and magnetite; red inorganic pigments such as red oxide, and red lead; blue inorganic pigments such as ultramarine blue, and cobalt blue; yellow inorganic pigments such as chrome yellow, and zinc yellow; and inorganic pigments having respective colors. In the case of lubricant, spherical silica oxide and the like can be used.

The thickness of the polyester resin in the present embodiment is preferably 5 to 50 µm. Note that the values of the lower limit and the upper limit concerning the thickness of the polyester resin may define an arbitrary range selected from among values ranging from 5 to 50 by increments of 1, with a more preferable range being of 10 to 20 µm, for example. If the thickness of the polyester resin is less than 5 µm, the metal sheet as the substrate is liable to be exposed after drawing for thinning. On the other hand, increasing the thickness of the polyester resin more than 50 µm offers little change in the effect and is disadvantageous on an economical basis.

Note that in the case where the polyester resin is formed of a plurality of layers, the thickness of each layer is not particularly limited but can be set according to the purpose. For example, in the case where the polyester resin is formed of two layers, the thickness of a surface layer is preferably 0.05 to 0.75 times the total thickness of the layers. If this proportion is less than 1/20, a lower layer may be exposed at a can wall portion after forming; if the proportion is more than 3/4, the effect of the present invention cannot be obtained satisfactorily.

In addition, in the case where the polyester resin is formed of three layers, the thickness of the surface layer is preferably 0.06 to 0.25 times the total thickness of the layers. If this proportion is less than 0.06, a layer in contact with a surface layer may be exposed at a can wall portion after forming; if the proportion is more than 0.25, the effect of the present invention cannot be obtained satisfactorily.

Besides, the polyester resin used in the present embodiment has a characteristic such that the difference, between a surface layer and an adjacent layer in contact with the surface layer, in tensile stress at an elongation of 250% under an environmental temperature of 70° C. is less than 3 MPa in tensile tests in a single-layer film state (or in the case where the relevant layer is used as a single-layer film) corresponding to each layer, and the difference in tensile stress at an elongation of 250% under an environmental temperature of 90° C. is less than 5.5 MPa in tensile tests in the single-layer film state. Note that the method for measuring the tensile stress will be described later, referring to a drawing.

<Polyester Resin-Coated Metal Sheet>

Figure 1:
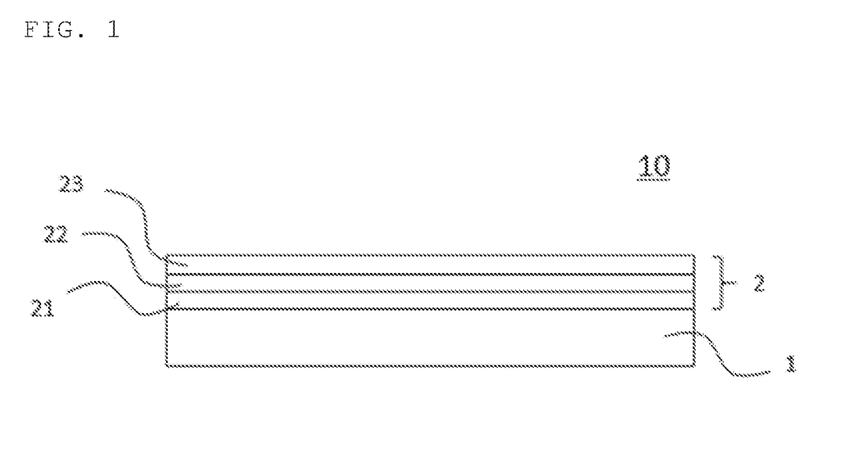
FIG. 1 is a sectional view of a polyester resin-coated metal sheet 10 according to the present embodiment.

FIG. 1 is a sectional view of a polyester resin-coated metal sheet 10 according to an embodiment of the present invention.

The polyester resin-coated metal sheet 10 in the present embodiment is configured including a metal sheet 1 as a substrate, and a polyester resin 2.

In the present embodiment, the polyester resin 2 is formed of a plurality of layers, and has a three-layer structure composed of a lower layer 21, a core layer 22, and a surface layer 23 disposed in this order from the side of the metal sheet 1.

Of these layers, the surface layer 23 is preferably formed, for example, from a copolymerized polyester resin of ethylene terephthalate and ethylene isophthalate (PETI) in which the content of isophthalic acid is 10 to 13 mol %, and the surface layer 23 is configured containing the above-mentioned fine particles.

In addition, the core layer 22 as an adjacent layer adjacent to the surface layer 23 is preferably formed, for example, of a polyester resin which is the above-mentioned PETI in which the content of isophthalic acid is 1 to 7 mol %. Note that the core layer 22 may contain the above-mentioned fine particles.

Besides, the lower layer 21 is preferably formed, for example, of a polyester resin which is the above-mentioned PETI in which the content of isophthalic acid is not less than 13 mol %.

Note that the polyester resin 2 may be formed in a two-layer structure by omitting the core layer 22 or the lower layer 21 (hereinafter the core layer 22 will be omitted, for convenience of explanation, to realize the two-layer structure), or may be formed of four or more layers. Further, there may be added other layers, such as a protective layer provided on the polyester resin 2, or an adhesive layer for adhesion between the metal sheet 1 and the polyester resin 2.

As a method for coating the metal sheet 1 with the polyester resin 2, any of known film lamination methods and extrusion lamination methods can be applied. Thermal adhesion of the polyester resin 2 to the metal sheet 1 is conducted by the quantity of heat possessed by the polyester resin 2 in a molten state and the quantity of heat possessed by the metal sheet 1.

Here, a suitable heating temperature for the metal sheet 1 is generally 90° C. to 290° C., particularly 100° C. to 230° C. On the other hand, the temperature of a laminating roll for heating the polyester resin 2 is suitably in the range of 10° C. to 150° C. Note that in the case where coating of the metal sheet 1 with the polyester resin 2 is performed by a film lamination method, it is preferable to use a non-oriented polyester resin.

<Method of Producing Container (Seamless Can)>

The polyester resin-coated metal sheet 10 produced in the present embodiment is applicable to various containers. While description will be made hereinafter by taking a seamless can as an example of container, the present invention can be suitably used also for other cans, boxes and the like capable of containing beverage, food or medicine.

Figure 2:
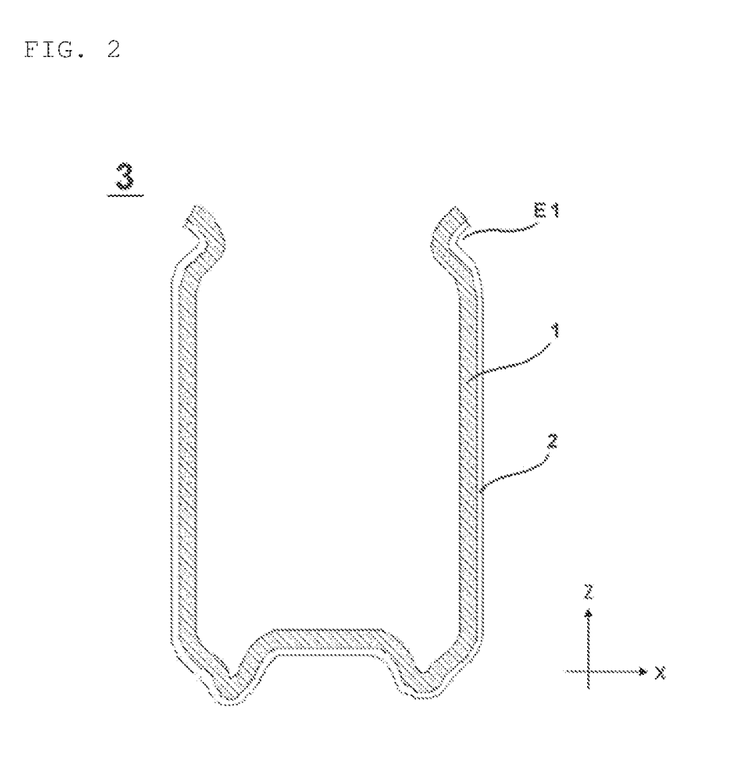
FIG. 2 is a sectional view of a seamless can processed by use of the polyester resin-coated metal sheet according to the present embodiment.

A seamless can in the present embodiment is produced by applying a known technique such as so-called drawing and ironing, and bending and elongating (stretching) to the polyester resin-coated metal sheet 10 in such a manner that the aforementioned polyester resin 2 is disposed on the can outer surface side, as illustrated in FIG. 2.

After the polyester resin-coated metal sheet 10 is formed into a can structure, a heat treatment for the purpose of, for example, relaxing stress in the polyester resin 2 is performed, and thereafter a can wall portion is subjected to multi-color printing or application of varnish. Before the printing, base coating of metallic tone, white color or the like may be conducted. After the printing, a heat treatment for the purpose of curing the ink is carried out.

EXAMPLES

The present invention will be described more specifically below, referring to Examples.

Example 1

As a non-oriented polyester resin 2 to be disposed on the can outer surface side, there was used a clear film obtained by copolymerization of polyethylene terephthalate with isophthalic acid (hereinafter, PET/IA) in which a surface layer 23 and a lower layer 21 differ from each other in isophthalic acid concentration and, hence, in melting temperature. In the clear film used, only the surface layer 23 contained added thereto 1.0 vol % of fine particles (titanium oxide) having a particle diameter of 0.25 µm, the surface layer thickness was 4 µm, the lower layer thickness was 16 µm, and the total thickness of these layers was 20 µm. Thus, in Example 1, the polyester resin 2 on the can outer surface side has a two-layer structure. In addition, a PET/IA film which is a non-stretched clear film was used on the can inner surface side.

Besides, as a substrate 1, there was used TFS (tin free steel) obtained by subjecting a 0.24 mm-thick steel sheet to a cathodic electrolyzing treatment in a fluoride-added chromic acid bath, as a surface treatment to attain a metallic chromium amount of 120 to 130 mg/m$^2$ and a chromium oxide amount of 11 to 13 mg/m$^2$. Using the aforementioned films and TFS, a polyester resin-coated metal sheet 10 was produced by a laminating apparatus (not illustrated). In a laminating step conducted by the laminating apparatus, the TFS was heated to 255° C., and the above-mentioned films were thermocompression bonded individually to each of the inner and outer surfaces of the TFS by using silicone rubber, immediately followed by quenching in water.

Both surfaces of the polyester resin-coated metal sheet 10 thus obtained were coated with paraffin wax by electrostatic coating, then the polyester resin-coated metal sheet 10 was blanked into a circular shape having a diameter of 143 mm, and a shallow drawn cup was formed therefrom by a usual method. Next, the drawn cup was subjected twice to a simultaneous drawing and ironing operation, to form a cup having a small diameter and a large height. The thus obtained cup had the following properties.

Cup diameter: 52.0 mm
Cup height: 111.7 mm
Can wall portion thickness relative to original thickness: −30%

After the cup was subjected to doming, a heat treatment was conducted at 220° C. for 60 seconds, for removing strains from the polyester resin. Subsequently, trimming of an opening end portion and curved-surface printing were conducted, a heat treatment was performed at 205° C. for 120 seconds for baking, and, further, predetermined neck-in processing and flange processing were performed, to produce a 200 g seamless can. The curved-surface printing was conducted using a known coater with an indigo ink (coating weight: 40 mg/m$^2$) and varnish (coating weight: 130 mg/m$^2$).

Example 2

The same operations as in Example 1 were conducted except that the amount of the fine particles added to the surface layer 23 on the can outer surface side was 1.8 vol %.

Example 3

The same operations as in Example 1 were conducted except that the amount of the fine particles added to the surface layer 23 was 3.6 vol %.

Example 4

The same operations as in Example 1 were conducted except that the amount of the fine particles added to the surface layer 23 was 5.0 vol %.

Example 5

The same operations as in Example 2 were conducted except that the thickness of the surface layer 23 was 10 µm and the thickness of the lower layer 21 was 10 µm.

Example 6

The same operations as in Example 2 were conducted except that the thickness of the surface layer 23 was 16 µm and the thickness of the lower layer 21 was 4 µm.

Example 7

The same operations as in Example 2 were conducted except that the amount of the fine particles added to the lower layer 21 was 5 vol %.

Example 8

The same operations as in Example 2 were conducted except that the amount of the fine particles added to the lower layer 21 was 12 vol %.

Example 9

The same operations as in Example 2 were conducted except that the amount of the fine particles added to the lower layer 21 was 15 vol %.

Example 10

The same operations as in Example 1 were conducted except that the fine particles in the surface layer 23 were silica oxide having a particle diameter of 1.0 µm.

Example 11

The same operations as in Example 10 were conducted except that the amount of the fine particles added to the surface layer 23 was 2.5 vol %.

Example 12

The same operations as in Example 10 were conducted except that the amount of the fine particles added to the surface layer 23 was 5.0 vol %.

Example 13

The same operations as in Example 8 were conducted except that the fine particles in the surface layer 23 were silica oxide having a particle diameter of 1.0 μm and the addition amount thereof was 2.5 vol %.

Example 14

A non-oriented film disposed on the can outer surface side was a three-layer film composed of a surface layer 23, a core layer 22 and a lower layer 21, the layers being different from one another in isophthalic acid concentration and, hence, in melting temperature. The surface layer 23 contained added thereto 1.8 vol % of fine particles (titanium oxide) having a particle diameter of 0.25 μm, the core layer 22 contained added thereto 12 vol % of fine particles (titanium oxide) having a particle diameter of 0.25 μm, and the lower layer 21 contained added thereto 0.2 vol % of fine particles (silica oxide) having a particle diameter of 2.5 μm. The surface layer thickness was 2 μm, the core layer thickness was 9 μm, the lower layer thickness was 2 μm, and the total thickness of these layers was 13 μm. Except for these points, the operations were conducted in the same manner as in Example 1.

Example 15

The same operations as in Example 14 were conducted except that the thickness of the core layer 22 was 12 μm.

Example 16

The same operations as in Example 14 were conducted except that the isophthalic acid concentration in the core layer 22 was changed so that the melting temperature was 245° C.

Example 17

The same operations as in Example 16 were conducted except that the amount of the fine particles added to the core layer 22 was 5 vol %.

Example 18

The same operations as in Example 16 were conducted except that the amount of the fine particles added to the core layer 22 was 17 vol %.

Example 19

The same operations as in Example 16 were conducted except that the amount of the fine particles added to the surface layer 23 was 3.6 vol %.

Example 20

The same operations as in Example 16 were conducted except that the isophthalic acid concentration in the surface layer 23 was changed so that the melting temperature was 235° C.

Comparative Example 1

The same operations as in Example 1 were conducted except that the amount of the fine particles added to the surface layer 23 was nil (0 vol %) (no addition).

Comparative Example 2

The same operations as in Example 8 were conducted except that the fine particles in the surface layer 23 were silica oxide having a particle diameter of 2.5 μm and the addition amount thereof was 0.2 vol %.

Comparative Example 3

The same operations as in Comparative Example 2 were conducted except that the amount of the fine particles added to the surface layer 23 was 1.0 vol %.

Comparative Example 4

The same operations as in Comparative Example 1 were conducted except that the isophthalic acid concentration in the surface layer 23 was changed so that the melting temperature was 215° C.

Comparative Example 5

The same operations as in Example 14 were conducted except that the amount of the fine particles added to the surface layer 23 was nil (0 vol %) (no addition).

The products obtained in Examples and Comparative Examples above were put to evaluation of the thickness of the polyester resin 2, evaluation of formability, evaluation upon the heat treatment step, and evaluation of coating material adhesion, as follows. Further, for Example 14 and Comparative Example 5, residual stress in the polyester resin 2 at a can wall portion in the formed can was measured.

<Evaluation Method Concerning Thickness of Polyester Resin 2>

The polyester resin 2 obtained was embedded in an epoxy-based embedding resin, the resulting body was sliced to a thickness of 5 μm, and the sliced section was observed under a microscope for measurement.

<Evaluation Method Concerning Formability>

For the outer surface side of the large-height cup obtained by repeating the above-mentioned drawing and ironing operation twice, the presence or absence of shaving or exfoliation of the polyester resin 2, shaving of the cup substrate or the like was evaluated by visual observation. Note that the evaluation of formability was conducted for all the Examples and Comparative Examples.

○: Shaving or exfoliation of the polyester resin 2 or shaving of the cup substrate was not observed.

x: Shaving or exfoliation of the polyester resin 2 or shaving of the cup substrate was observed.

(When the formability was ○, the relevant process was determined to have suitability to practical use.)

<Evaluation Method on Heat Treatment Step>

On the outer surface side of the large-height cup obtained by repeating the above-mentioned drawing and ironing operation twice, the presence or absence of marks of a conveyor for conveying the cups or marks of fusing, after the heat treatment for removing strains from the polyester resin 2 or after the heat treatment following the printing, was evaluated by visual observation.

○: Marks of welding to the polyester resin 2 or marks of fusing were not observed.

x: Marks of welding to the polyester resin 2 or marks of fusing were observed.

(When the evaluation on the heat treatment step was ○, the relevant process was determined to have suitability to practical use.)

<Evaluation Method for Coating Material Adhesion>

Figure 3:
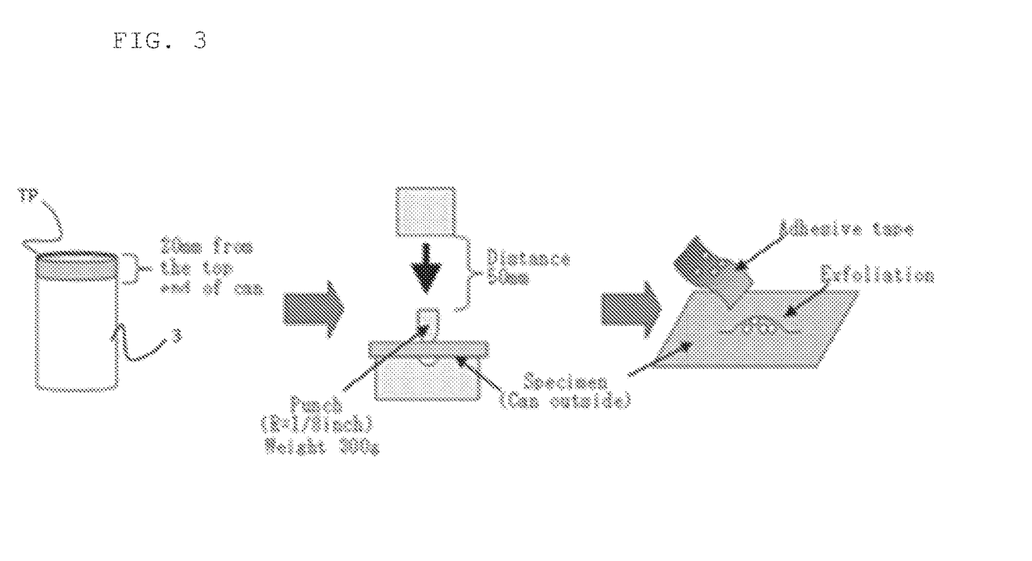
FIG. 3 is a figure for explaining an adhesion property evaluation technique for cans in Examples.

As illustrated in FIG. 3, that portion of a can 3 which is 20 mm from the top end of can (TP) was blanked, and DuPont impact was applied to a position of 7 mm from the top end of can (TP) from the can inner surface. The DuPont impact was applied by placing on a sample a round rod having a curvature of ⅛ inch at its tip, and falling thereon a weight of 300 g from a height of 50 mm above.

A deformed portion 31 generated by the DuPont impact was subjected to tape peeling. Thereafter, a portion at and around the deformed portion 31 having undergone tape peeling was put to image analysis, whereby the number of pixels exfoliated was calculated. Note that evaluation of the number of pixels exfoliated was conducted at five points in the can circumferential direction of each sample, and the average was obtained. An imaging apparatus used in this instance had 600,000 effective pixels.

Figure 4:
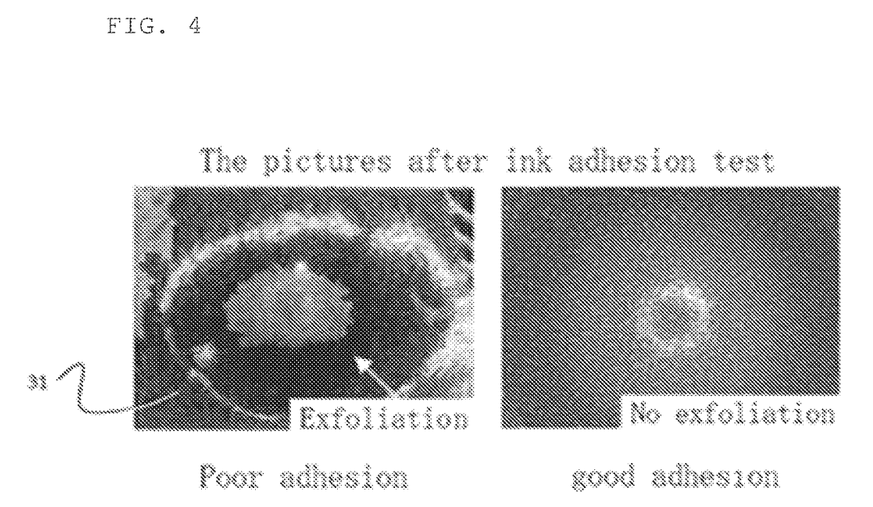
FIG. 4 is a partial enlarged view of a deformed portion of a can at the time of adhesion property evaluation.

FIG. 4 illustrates external appearance of the portion at and around the deformed portion 31 after the tape peeling. In the case where coating material adhesion is poor, the coating material is exfoliated from the can 3 and the underlying white film is exposed at and around the deformed portion 31, as illustrated in FIG. 4.

The results of calculation of the number of pixels exfoliated obtained by evaluation of coating material adhesion by such a technique were evaluated according to the following criterion.

⊚: The number of pixels exfoliated was not more than 4,000.

○: The number of pixels exfoliated was more than 4,000 and not more than 6,000.

x: The number of pixels exfoliated was more than 6,000.

<Tensile Stress Measurement for Film>

Figure 7:
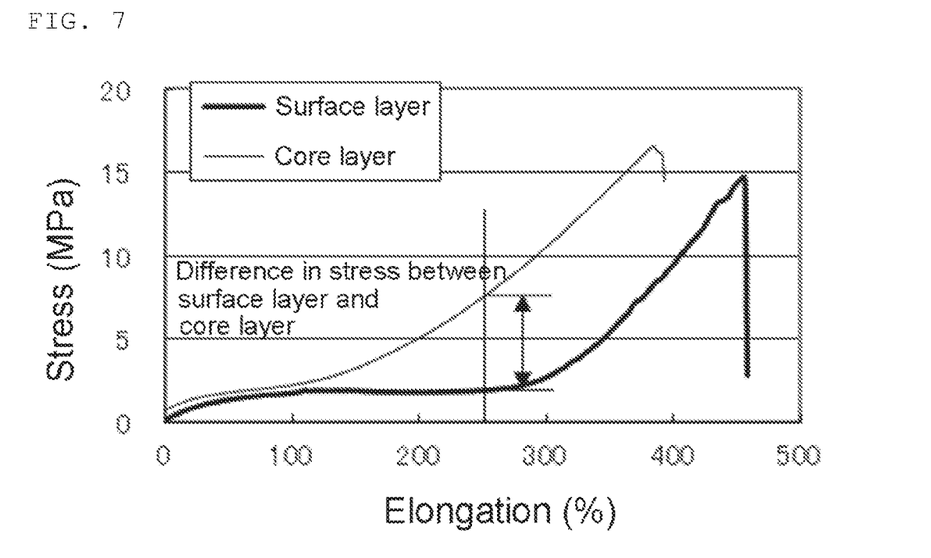
FIG. 7 is a figure illustrating that difference in stress between a surface layer and a core layer is obtained from tensile tests of polyester resins.

For the polyester resins used in Examples and Comparative Examples described above, films were individually formed in a single-layer film state (where the thickness was 20 μm) by a known extrusion method. The polyester resin films were each cut into a size of 5 mm by 30 mm, and the cut piece was set on a tensile tester. Thereafter, heating to a predetermined temperature was conducted by an electric oven, and tensile test was conducted at a tension speed of 200 m/minute. As an example of the results of this tensile test, elongation-stress relations at 90° C. in a single-layer film state corresponding to the surface layer 23 and the core layer 22 in Comparative Example 5 are illustrated in FIG. 7. Here, the position of evaluation of coating material adhesion on the can 3 described above corresponds to an elongation of around 250%, and, therefore, the stress and the difference in stress at an elongation of 250% were measured.

<Measurement of Residual Stress in Film at Can Wall Portion of Formed Can>

For Example 14 and Comparative Example 5 described above, residual stress in the polyester resin 2 at a can wall portion of the formed can was measured by TMA (TMA stands for thermomechanical analysis; TAS-300, made by Rigaku Corporation). As aforementioned, in the can after forming thereof, tensile and compressive residual stresses are generated in the height direction (Z-direction) and the circumferential direction (X-direction). Therefore, when the polyester resin 2 after peeling is heated, the dimensional changes occur in the Z-direction and the X-direction in such directions as to relieve the residual stresses. In view of this, the residual stress in the polyester resin 2 was estimated from the dimensional changes caused by heating.

To be more specific, the polyester resin-coated metal sheet 10 obtained by immersing the substrate 1 of the formed can in a hydrochloric acid solution to dissolve ECCS (chromate treated steel sheet, electrolytically chromium/chromium oxide steel) was cut at 7 to 10 mm from the top of the can side wall in the Z-direction (direction of 0° relative to the rolling direction) and at 7 mm from the top of the can side wall in the X-direction into a size of 5 mm in width by 25 mm in length. Then, the thus cut piece was heated from room temperature to 200° C. at a temperature rise rate of 5° C./minute under an initial load of 1 g, and dimensional change due to the heating was measured.

The compositions of the polyester resins 2 and the results of the above-mentioned evaluations in Examples and Comparative Examples described above are collectively set forth in FIGS. 5 and 6.

Figure 5A:
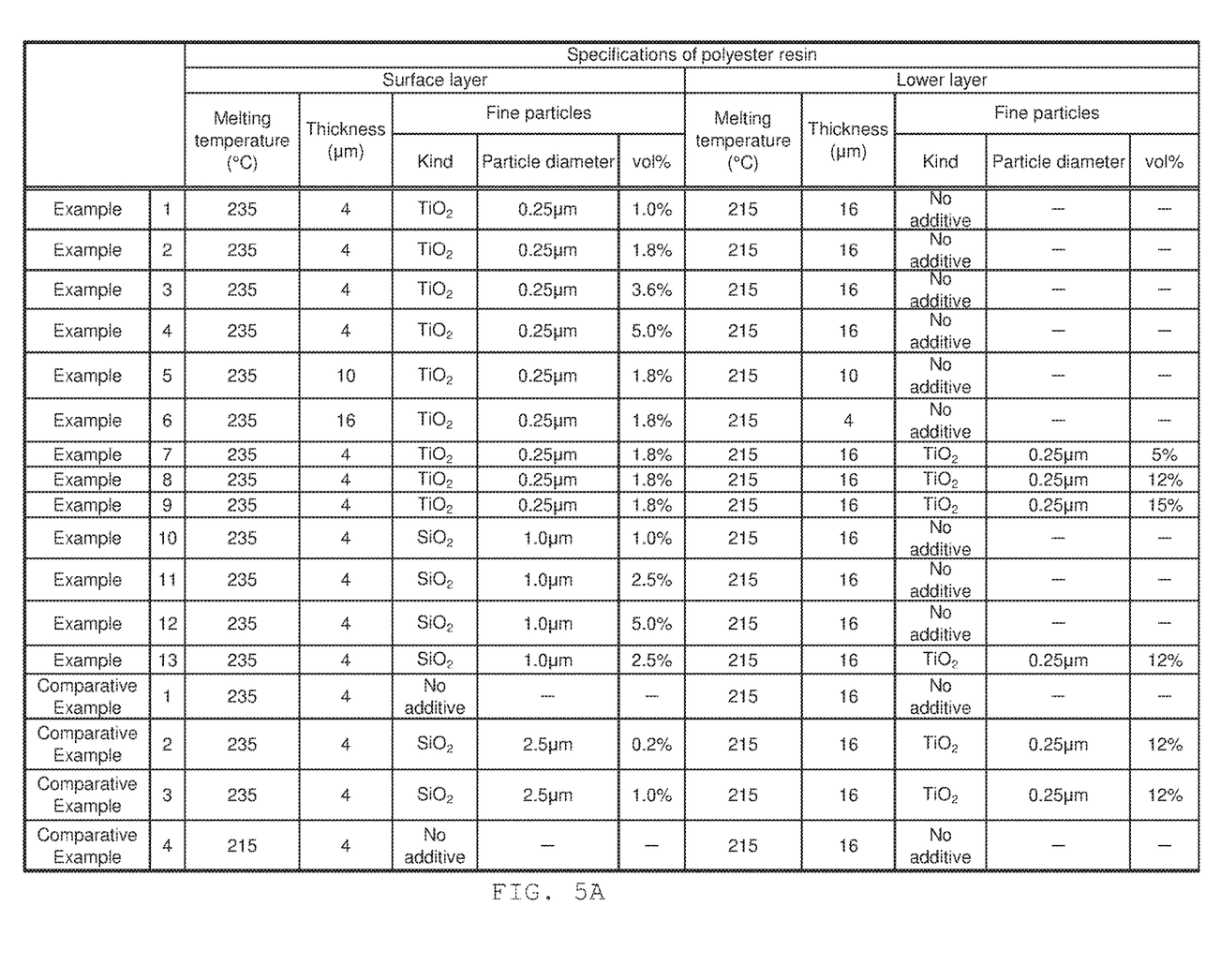
FIG. 5A and FIG. 5B are tables in which compositions of polyester resins in two-layer structures in Examples and Comparative Examples and evaluation results thereof are collectively set forth.
Figure 5B:
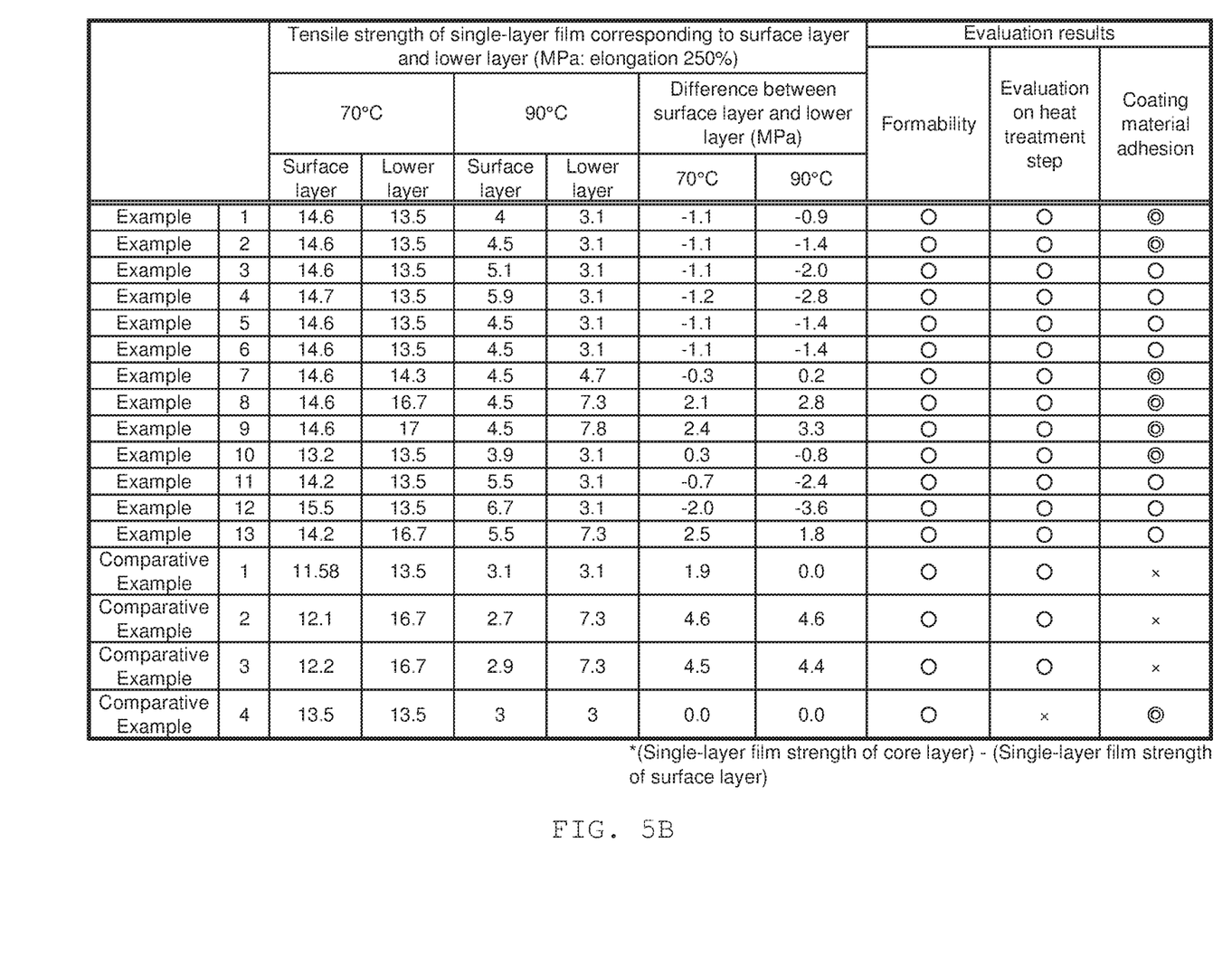

First, as illustrated in the tables in FIGS. 5A-5B, in Examples 1 to 13 in which fine particles were added to the surface layer 23 of the polyester resin 2 composed of two layers, it was depicted that the formability, the evaluation on heat treatment step, and the coating material adhesion are all good. In addition, in Examples 7 to 9 and 13 in which fine particles were added to both the surface layer 23 and the lower layer 21, also, it was depicted that the formability, the evaluation on heat treatment step, and the coating material adhesion are all good.

On the other hand, in Comparative Example 1 in which fine particles were not added to the surface layer 23, it was depicted that the ink is liable to be exfoliated and the coating material adhesion is insufficient. Besides, in Comparative Examples 2 and 3 in which the particle diameter of the fine particles added to the surface layer 23 was 2.5 μm, it was depicted that the coating material adhesion is poor, and the effect of the present invention cannot be obtained. In Comparative Example 4 in which the surface layer 23 and the lower layer 21 were formed of the resin of the same composition, the coating material adhesion was good, but due to the low melting temperature, fusing of the resin to the conveyor and the like would be generated at the time of conveyance of the cans, and marks of fusing were left on the cans, so that the relevant process is unsuited to practical use.

Figure 6A:
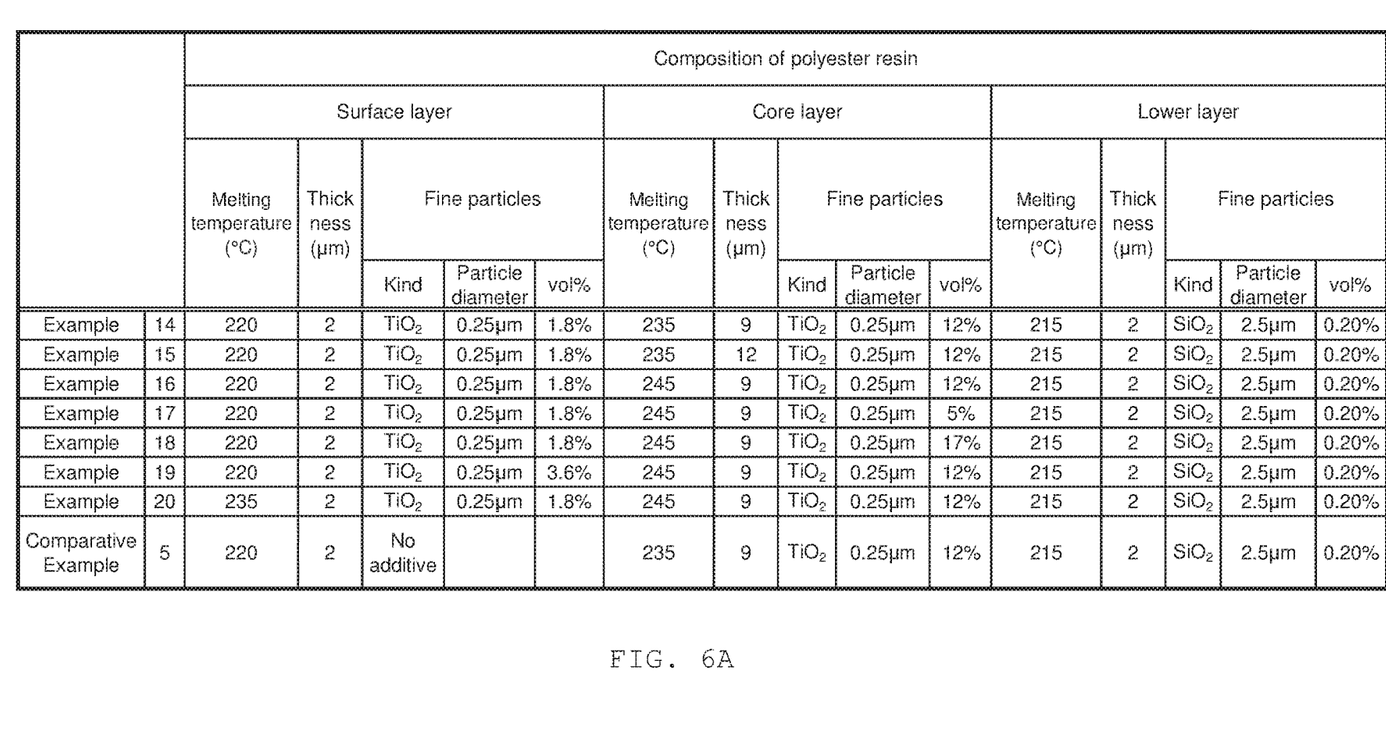
FIG. 6A and FIG. 6B are tables in which compositions of polyester resins in three-layer structures in Examples and Comparative Examples and evaluation results thereof are collectively set forth.
Figure 6B:
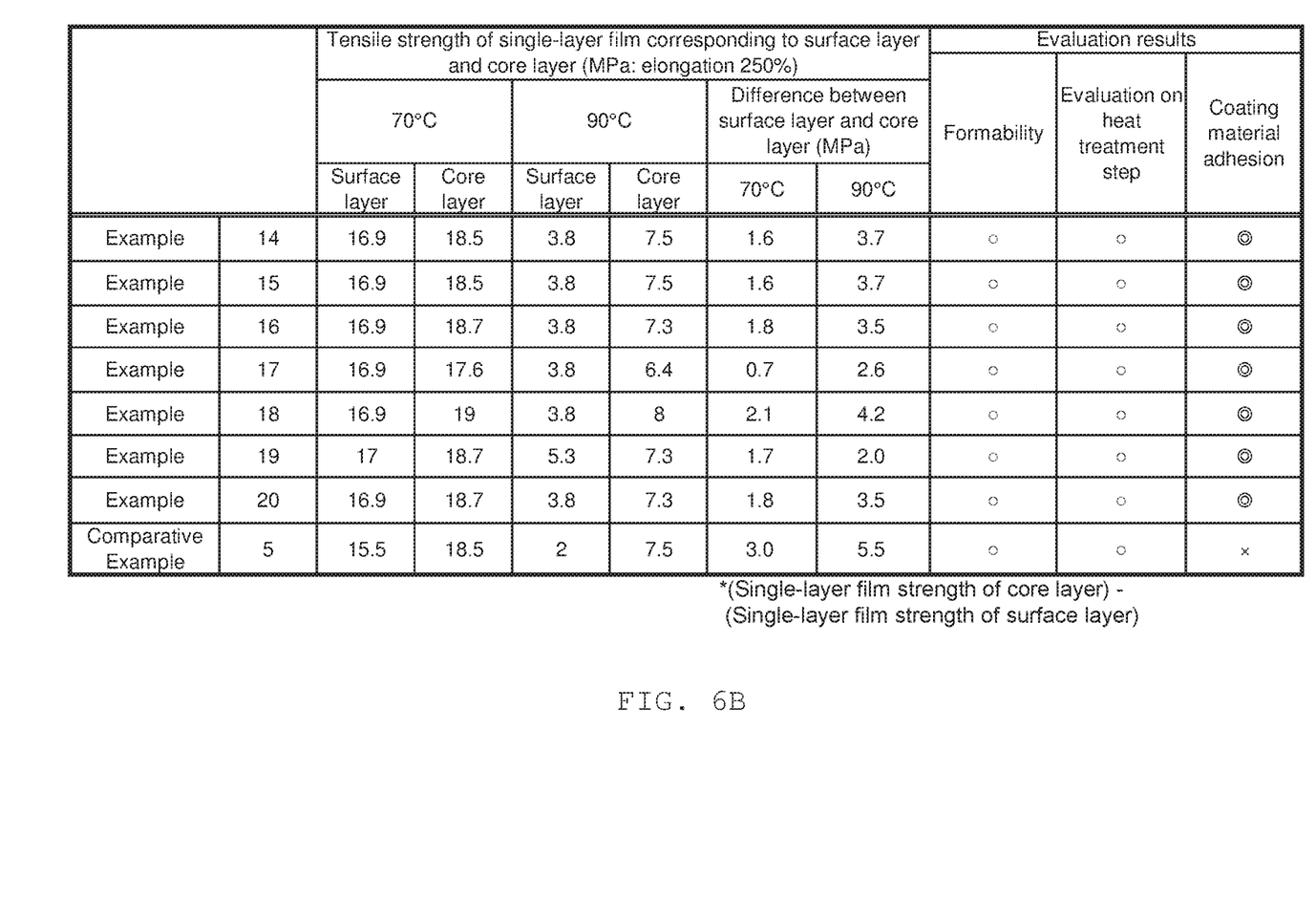

In addition, as illustrated in the tables in FIGS. 6A-6B, in the case where the polyester resin 2 is composed of three layers, also, in Examples 14 to 19 in which the fine particles were added to the surface layer 23, it was depicted that the formability, the evaluation on heat treatment step, and the coating material adhesion were all good. However, in Comparative Example 5 in which the fine particles were not added to the surface layer 23, it was depicted that the ink is liable to be exfoliated, and the coating material adhesion is insufficient.

Figure 8:
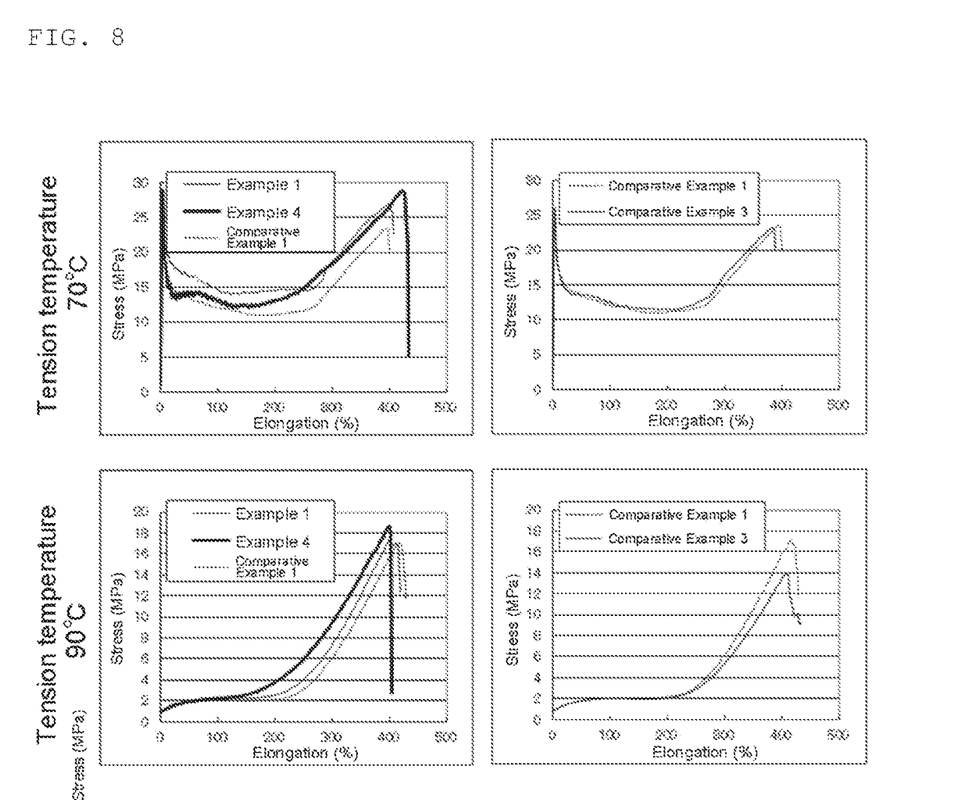
FIG. 8 is a graph illustrating a stress-elongation relation in tensile tests of polyester resins in surface layers in Examples and Comparative Examples.

Thus, in the present invention, it was found out that when fine particles are added to the polyester resin 2, deformation behavior (elongation-stress curve) of the resin in tensile tests changes, as illustrated in FIG. 8. Note that in FIG. 8, there are depicted deformation behaviors of the polyester resins when the resins are put to a tensile test in a single-layer film state corresponding to the surface layer 23, in Example 1, Example 4, Comparative Example 1, and Comparative Example 3. Particularly, it was found that the change in the deformation behavior of the polyester resin 2 due to the addition of the fine particles is great in the vicinity of the glass transition point Tg of the polyester resin 2. On the other hand, it was confirmed that in the case where the diameter of the fine particles is 2.5 μm as described in Comparative Example 3, the deformation behavior of the resin is small even when the fine particles are added. From this fact, also, it is considered that in the case of addition of fine particles to the surface layer 23 of the polyester resin 2, it is possible to reduce residual stress after forming and to restrain ink exfoliation after coating, even if the difference in melting temperature between the surface layer 23 and the adjacent layer in contact therewith is large. Particularly, it is considered that since the drawing of the seamless can may be conducted in the vicinity of Tg (elongation: 250%), the behavior of the polyester resin 2 at the time of drawing has a great influence.

Figure 9:
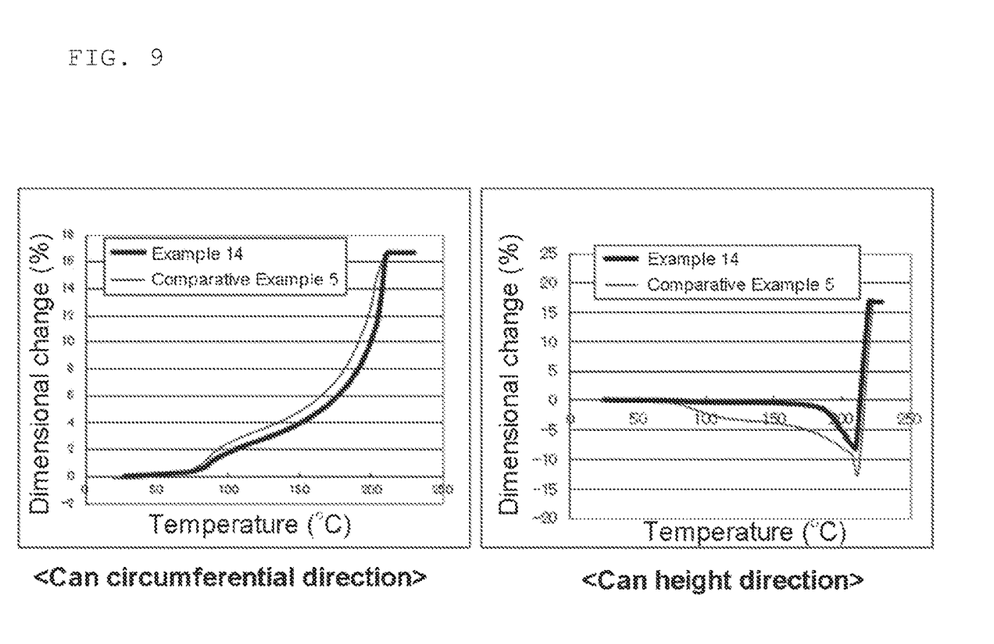
FIG. 9 is a graph illustrating the results of measurement of residual stress in a polyester resin on a can wall portion.

FIG. 9 illustrates the results of measurement of residual stresses in the polyester resin 2 at a can wall portion of the formed can by the aforementioned method, for Example 14 and Comparative Example 5. According to the results illustrated, it is seen that the dimensional change of the film (polyester resin) in Example 14 is smaller than that in Comparative Example 5, in a temperature range of 70° C. to around 200° C., both in the can circumferential direction and in the can height direction. In other words, it is evident that it was verified that the residual stress in the film is reduced by the effect of the present invention.

Note that Examples and Comparative Examples described above can be variously deformed within such ranges as not to depart from the gist of the present invention.

INDUSTRIAL APPLICABILITY

As has been described above, the polyester resin-coated metal sheet and the container using the same of the present invention are suited to production of a container which withstand severe processing and which retains decorative property and design property.

REFERENCE SIGNS LIST

1 Substrate (Metal sheet)
2 Polyester resin
3 Can
10 Polyester resin-coated metal sheet
21 Lower layer
22 Core layer
23 Surface layer
TP Top end of can
E1 Vicinity of upper end of can wall portion

What is claimed is:

1. A polyester resin-coated metal sheet comprising:
a metal sheet; and
a non-oriented polyester resin including a three-layer film composed of a surface layer, a core layer and a lower layer provided on at least one surface of the metal sheet,
wherein, of the three-layer film, the surface layer and the core layer in contact with the surface layer have a difference therebetween in melting temperature of not less than 10° C., and a difference therebetween in tensile stress at an elongation of 250% under an environmental temperature of 70° C. of less than 3 MPa in tensile tests in a single-layer film state corresponding to each layer,
the surface layer contains first fine particles having a diameter of 0.1 to 2 μm in an amount of 0.1 to 20 vol %,
the core layer contains second fine particles and the lower layer contains third fine particles,
the content of the first fine particles in the surface layer is higher than the content of the third fine particles in the lower layer,
the third fine particles in the lower layer are made of different material from the first fine particles in the surface layer or from the second fine particles in the core layer, and
the surface layer is formed from a copolymerized polyester resin in which the content of isophthalic acid is 10 to 13 mol %, and the core layer is formed of a polyester resin in which the content of isophthalic acid is 1 to 7 mol %.

2. The polyester resin-coated metal sheet according to claim 1, wherein the surface layer and the core layer have a difference therebetween in tensile stress at an elongation of 250% under an environmental temperature of 90° C. of less than 5.5 MPa in tensile tests in a single-layer film state corresponding to each layer.

3. The polyester resin-coated metal sheet according to claim 2, wherein the non-oriented polyester resin in the core layer contains second fine particles having a diameter of 0.1 to 2 μm in an amount of 5 to 20 vol %.

4. A container formed by use of the polyester resin-coated metal sheet according to claim 3.

5. A container formed by use of the polyester resin-coated metal sheet according to claim 2.

6. The polyester resin-coated metal sheet according to claim 1, wherein the non-oriented polyester resin in the core layer contains second fine particles having a diameter of 0.1 to 2 μm in an amount of 5 to 20 vol %.

7. A container formed by use of the polyester resin-coated metal sheet according to claim 6.

8. A container formed by use of the polyester resin-coated metal sheet according to claim 1.

9. The polyester resin-coated metal sheet according to claim 1, wherein the content of the first fine particles in the surface layer is higher than the content of the second fine particles in the core layer.

* * * * *